3,091,273
PNEUMATIC TIRE HAVING A SEPARATE AND REMOVABLE TREAD AND A COMPLEMENTARY CARRYING CARCASS
Carlo Bottasso, Milan, Italy, assignor to
Pirelli S.p.A., Milan, Italy
Filed Feb. 9, 1960, Ser. No. 7,623
Claims priority, application Italy Feb. 10, 1959
3 Claims. (Cl. 152—187)

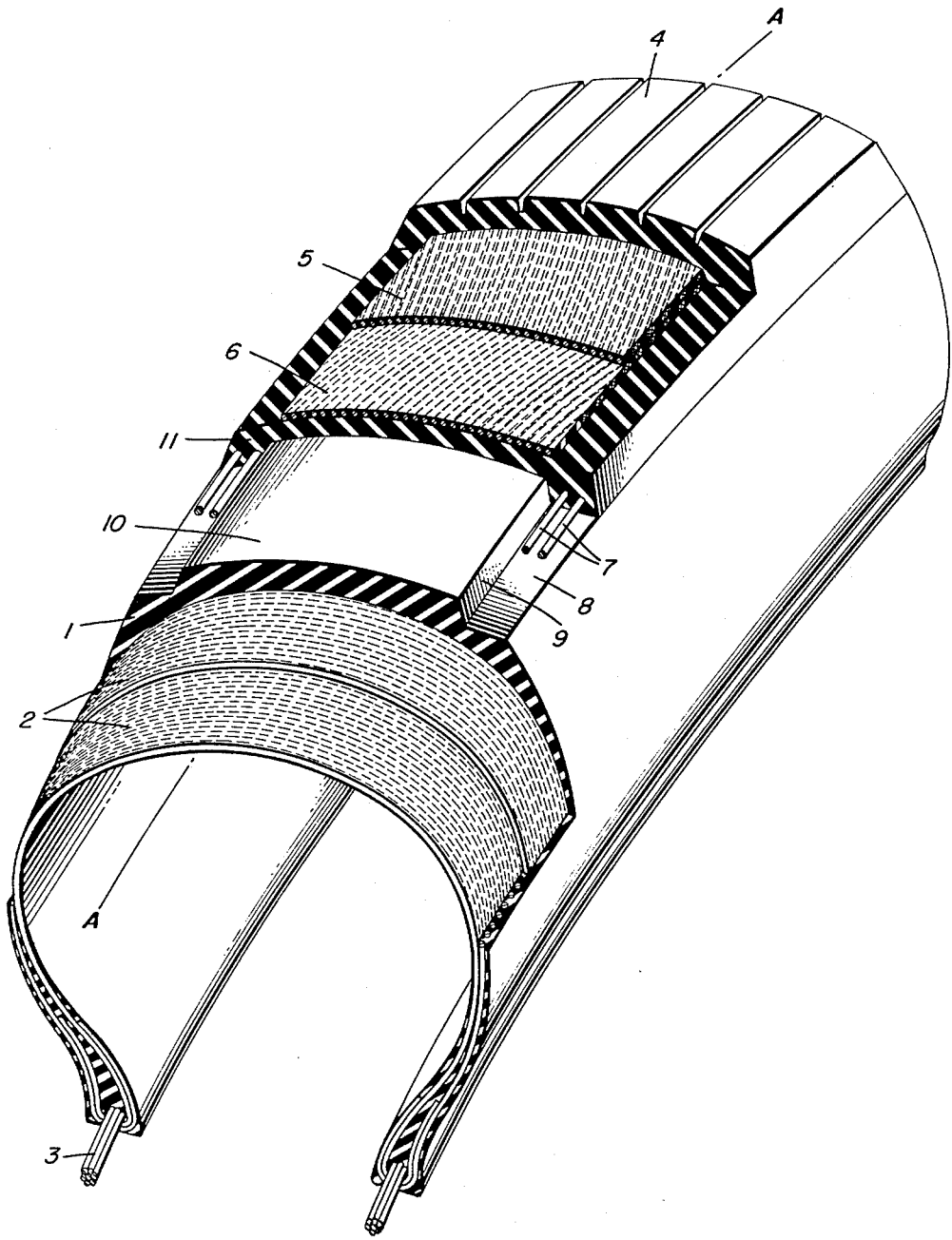

The present invention relates to a pneumatic tire and, more particularly, to a tire having a separate tread portion which is removable from the carcass. Also, this invention relates to a carrying carass which is suitable for receiving the removable tread portion.

The prior art teaches that it is old to provide a pneumatic tire with a removable tread ring; for example, see United States Patent No. 2,874,742. In the last-mentioned patent the removable tread is in the form of a substantially cylindrical and ring-shaped rubber tread. The tread is made inextensible by providing the same inwardly with a tension-resistant reinforcing armour consisting of at least two layers of cords, where the cords of each layer are disposed in side-by-side relation and in a direction substantially parallel to the equatorial plane of a tire. These cords are made of a textile or metallic material which is substantially inextensible. The aforementioned patent also includes a carrying carcass (or casing) including one or more layers of radially disposed carcass cords made of substantially inextensible textile or metallic material. The carcass is shaped so that its top portion is adapted to receive and come in contact with the substantially cylindrical surface of the tread. In the above case the tread ring and the carcass can be vulcanized separately.

In addition to the teaching of the above-mentioned patent, it is also known that the carcass can be manufactured in such a way that the carcass plies are eliminated, the carcass being provided only with metallic bead wires or cores. In such a case, the carcass can be made of a compound of natural and/or synthetic rubber or other synthetic plastic materials.

In the above known constructions, the perfect adhesion of the tread ring to the carcass is a critical condition for the proper operation of the tire. This condition is achieved as a result of the fact that the tread ring, by virtue of its inextensible properties, opposes the expansion of the carcass (resulting from the inflation pressure) and thus is forced against the carcass. Therefore, in the above two constructions, it is essential that the tread ring be provided with a reinforcing armour which will render it inextensible.

In order to avoid possible harmful creepings between the contacting surfaces of the tread ring and the carcass, it is necessary that the carcass should follow the small torsional movements in the wheel plane which are imparted to it by the tread during the movement of the vehicle. This effect is obtained, as stated above, by making a carcass without carcass plies or by having a carcass composed of radial cords.

Tires of the above type have been successfully employed up to the present time. However, in some particular instances they have exhibited certain disadvantages. Thus, for example, when the tread ring (so reinforced) is placed under tension by the inflation pressure of the tire so as to insure the forcing of the tread ring against the casing, the tread becomes somewhat rigid. This rigidity limits the capacity of the tire to absorb, through deformation, the irregularities of the road. This can be a considerable disadvantage when, as in the case of pleasure vehicles, the tires must have an extremely high characteristic of travelling comfort.

With further regard to the tires of the two different types mentioned above, the man skilled in the art recognizes that these tires have a low lateral stability. However, this disadvantage is not important in the case of tires intended for use in the case of industrial and transport vehicles, but it does constitute a drawback in the case of tires designed for pleasure vehicles. The undesirable effects of low lateral stability become particularly evident when the vehicle is running on a curve or is travelling on a road whose transversal profile is not perfectly flat.

The purpose of the present invention, therefore, is to provide a tire having a separate tread in which the above-mentioned disadvantages and inconveniences are eliminated. Thus, it is the intention of the present invention to provide a tire which will include the improved features of greater travelling comfort and greater lateral stability.

The present invention provides a pneumatic tire having a separate tread, also in the form of a ring, and which also includes, adjacent its inner surface, a substantially inextensible reinforcement capable of withstanding tension stresses. However, this reinforcement is formed of cords inclined with respect to the mid-circumferential plane of the tire and crossed with respect to one another. Furthermore, this tread ring will also have, along its inner surface, two continuous longitudinal ridges having an approximately rectangular section and disposed at the side edges of the tread ring. The inner surface of the tread ring between these ridges will be substantially smooth. The outer surface of the carrying carcass, in the portion adapted to come in contact with the tread ring, has a profile complementary to that of the inner surface of the ring. Thus, the outer surface of the carcass is higher in the central part for a width equal to that between the lateral ridges of the tread ring.

The carcass of the present invention may be provided with carcass plies having radial cords. However, the carcass can be made without any plies whatsoever, as suggested in the second known construction referred to above.

In accordance with a preferred embodiment of the present invention, the reinforcements in the tread ring are formed of two or more superposed layers of rubberized cords oriented in two directions crossed with respect to the mid-circumferential plane of the tire, the cords being paralle to one another in each layer and inclined with respect to said plane at an angle ranging from 5° to 20°. The cords of the carcass (where plies are employed) or of the reinforcement for the tread can be of any suitable natural, artificial (or synthetic) textile or metallic material, providing that the said materials are substantially inextensible. These materials can be rubberized with compounds of natural and/or synthetic rubber or with synthetic plastic materials similar to rubber.

When a tire of the present invention is inflated the tread ring will be forced not only in a radial direction (as in the recognized constructions of the prior art referred to above), but also in the transversal direction. The reinforcing cords of the tread ring, composed of superposed layers of inextensible cords crossed at relatively small angles, cause the tread ring, when placed under tension by the inflation pressure of the tire, to oppose the extension of the carrying carcass lying below it, thus remaining radially forced against the carcass. Moreover, the cords constituting the reinforcing armour tend to reduce their mutual inclination, approaching the longitudinal direction and, therefore, the tread ring tends to expand slightly in the radial direction and to shrink slightly in the transverse direction. This slight movement, however, is contrasted by the fact that the continuous longitudinal ridges at the edges of the tread ring are retained in their mutual positions by the higher central portion of the carcass. Thus, these ridges exert a transversal force against the side walls of the raised central portion which, in combination with the radial force referred to above, makes the union of the two parts quite firm.

The longitudinal ridges of the tread rings are preferably reinforced, in the same manner that the central portion of the tread ring is rendered inextensible (or in the same manner that the beads of the tire casings are made inextensible), in order to improve the seating of the ridges against the walls of the higher central portion of the carcass. Thus, the present invention employs longitudinal reinforcing elements which can be more than one for each longitudinal ridge and which can be made of single wires or metal cords. When these reinforcing elements are employed in the ridges, the width of the central reinforcement of the tread ring itself is preferably limited to the central portion of the tread ring comprised between the longitudinal ridges.

The advantages of the tire of the present invention over the prior art tires referred to above can be summarized as follows:

(a) the reinforcing elements of the tread ring, being constituted of cords inclined with respect to the mid-circumferential plane of the tire, maintain a certain deformability even when the tire is inflated and consequently tends to reduce the effect of road irregularities; on the other hand, the rigidity of the tread ring can be suitably adjusted by varying the inflation pressure in the tire in order to compensate for road (and load) conditions;

(b) the characteristics of lateral stability of the tire are improved by the presence of the crossed structure constituted by the reinforcing elements of the tread ring;

(c) since the reinforcing elements are composed of cords inclined with respect to the mid-circumferential plane of the tire, it is no longer necessary for the tread ring to assume the previously substantially cylindrical form required in the case of the parallel longitudinal cords; thus, it is possible to shape the tread ring in the form of a relatively arcuate section so as to improve the comfort characteristics of the tire;

(d) the transverse forces exerted by the longitudinal ridges of the tread rings against the carcass maintain the tread rings fast against the carcass even when the tire is slightly deflated. (If the latter occurs during operation, the vehicle can be stopped before the tread ring becomes detached from the carcass).

Therefore, it is the principal object of the present invention to provide a tire of the type referred to above wherein the separate tread ring includes at least two layers of inextensible cords crossed with respect to one another, the cords of each layer being parallel to one another and inclined with respect to the mid-circumferential plane of the tire at angles ranging between 5° and 20°.

Another object of the present invention is to provide a tire of the type referred to above wherein the tread ring also includes continuous longitudinal ridges at the edges of its inner surface, said ridges having an approximately rectangular cross-section.

A further object of the present invention is to provide a tire of the type referred to above wherein the carcass has a complementary profile suitable for seating thereon the tread ring including the longitudinal ridges thereof.

A still further object of the present invention is to provide a tire of the type referred to above wherein each continuous longitudinal ridge includes at least one substantially inextensible longitudinal reinforcing element embedded therein, said reinforcing element being in the form of a single wire or a wire cord.

Other and further objects and advantageous features of the present invention will hereinafter more fully appear in connection with the detailed description of the drawing.

The single FIGURE of the drawing is a perspective view, partly diagrammatic and with portions of the layers of rubber and of the cords broken away, of a tire constructed in accordance with the present invention.

Referring to the drawing, the tire is composed of a carcass 1 and a tread ring 4, the latter being separate from the carcass and, thus, being interchangeable. The carcass is provided with two layers 2 of rubberized cords disposed radially and turned about the bead wires 3. The outer surface of the carcass has a central portion 10 which is higher than, or raised with respect to, the two lateral portions 8. The central portion 10 is connected to the lateral portions 8 by means of substantially radial walls 9 which, preferably, form an angle of about 90° with the central surface 10. This angle may, however, range from about 75° to about 105°.

The tread ring 4 has an outer road-contacting surface with a suitable pattern designed in accordance with the use for which the tire is destined. The inner surface of the tread ring 4 has a central portion substantially smooth, corresponding to the central portion 10 of the carcass. At the side of the inner surface of the tread ring 4 there are two continuous longitudinal ridges 11 having an approximately rectangular cross-section. The ridges 11 bear against the corresponding portion 8 of the carcass and are each reinforced with two metal wires 7. The tread ring 4 is also provided with reinforcing members formed of two layers 5 and 6 which are located in the central portion of the tread rings between the ridges and adjacent the inner surface of the tread ring. These two layers, 5 and 6, are composed of rubberized cords inclined with respect to the mid-circumferential plane A—A, at equal and opposite angles of about 10°. It is possible to use more than two layers of cords forming the reinforcing members, although it should be understood that the cords are always oriented in two directions crossed with respect to the mid-circumferential plane of the tire.

Since the tread ring and the carcass are vulcanized separately, they can also be composed of non-covulcanizable materials; thus, for example, if the carcass is made of a compound such as natural rubber, the tread ring can be made of a synthetic rubber or like products which vulcanize or polymerize with heat treatments and technological processes considerably different from those employed in connection with the vulcanization of natural rubber.

Whereas the present invention has been described, by way of non-limiting example, in relation to the drawing attached hereto, it should be understood that other and further modifications, apart from those shown or suggested herein, may be made within the spirit and scope of this invention.

What is claimed is:

1. In a pneumatic tire of the type having a separate and interchangeable tread ring and a carcass adapted to receive said tread ring, wherein said tread ring contains internal reinforcements adapted to resist tension, and wherein the carcass is designed to follow the small torsional movements in the plane of the wheel which are imparted to it by the tread ring during the movement of the vehicle, the improvement wherein the reinforcement in the tread ring is composed of at least two layers of rubberized and substantially inextensible cords oriented in two directions crossed with respect to the mid-circumferential plane of the tire, the cords of each layer being all parallel to one another and inclined with respect to said plane at an angle ranging from 5° to 20°, said tread ring having at the side edges of its inner surface two continuous longitudinal ridges of approximately rectangular cross-section, said inner surface of said tread ring between said ridges being substantially smooth, the outer surface of the carcass, in the portion whereon the tread ring is received, having a profile complementary to that of the inner surface of the tread ring.

2. A pneumatic tire as set forth in claim 1 wherein the carcass is provided with at least one layer of rubberized cords disposed in radial planes passing through the rotational axis of the tire.

3. A pneumatic tire as set forth in claim 1 wherein the continuous longitudinal ridges of the tread ring each contain at least one substantially inextensible longitudinal reinforcing element.

References Cited in the file of this patent

UNITED STATES PATENTS

| | | |
|---|---|---|
| 715,305 | Seddon | Dec. 9, 1902 |
| 1,235,485 | Keim | July 31, 1917 |
| 1,524,177 | Granville | Jan. 27, 1925 |
| 2,254,329 | Stephens | Sept. 2, 1941 |
| 2,826,233 | Cooper | Mar. 11, 1958 |
| 2,874,742 | Lugli | Feb. 24, 1959 |
| 2,953,181 | Barassi | Sept. 20, 1960 |

FOREIGN PATENTS

| | | |
|---|---|---|
| 1,148,638 | France | June 24, 1957 |